(12) United States Patent
Price

(10) Patent No.: US 12,172,227 B1
(45) Date of Patent: Dec. 24, 2024

(54) ADDITIVE FRICTION STIR DEPOSITION ON COLD SPRAYED BARRIER LAYER

(71) Applicant: BAE Systems plc, London (GB)

(72) Inventor: Howard James Price, Balderstone (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 18/712,425

(22) PCT Filed: Nov. 25, 2022

(86) PCT No.: PCT/GB2022/052989
§ 371 (c)(1),
(2) Date: May 22, 2024

(87) PCT Pub. No.: WO2023/099872
PCT Pub. Date: Jun. 8, 2023

(30) Foreign Application Priority Data

Nov. 30, 2021 (EP) ..................................... 21275172
Nov. 30, 2021 (GB) ..................................... 2117242

(51) Int. Cl.
*B23K 20/12* (2006.01)
*B32B 15/01* (2006.01)
*C22F 1/04* (2006.01)
*C23C 24/04* (2006.01)
*B23K 103/10* (2006.01)

(52) U.S. Cl.
CPC ........ *B23K 20/1215* (2013.01); *B23K 20/122* (2013.01); *B23K 20/128* (2013.01); *B32B 15/016* (2013.01); *C22F 1/04* (2013.01); *C23C 24/04* (2013.01); *B23K 2103/10* (2018.08)

(58) Field of Classification Search
None
See application file for complete search history.

(56) References Cited

U.S. PATENT DOCUMENTS

| 2021/0230716 | A1* | 7/2021 | Chehab | .................... C22F 1/04 |
| 2021/0276099 | A1* | 9/2021 | Chehab | .................. B33Y 10/00 |
| 2023/0191488 | A1* | 6/2023 | Chehab | .................. C22C 21/00 |
| | | | | 75/238 |

FOREIGN PATENT DOCUMENTS

CN 112404453 A 2/2021

OTHER PUBLICATIONS

Hang Z. Yu & Rajiv S. Mishra (2021) Additive friction stir deposition: a deformation processing route to metal additive manufacturing, Materials Research Letters, 9:2, 71-83, DOI: 10.1080/21663831.2020.1847211 (Year: 2021).*

(Continued)

*Primary Examiner* — Daniel J. Schleis
(74) *Attorney, Agent, or Firm* — Maine Cernota & Curran

(57) ABSTRACT

A method of manufacturing an article is described. At S102, the method comprises obtaining a first layer having a first face and a reverse second face, wherein the first layer comprises and/or is a first metal and wherein the first metal is a heat treatable first aluminium alloy. At S104, the method comprises providing a second layer on the first face of the first layer by cold spraying particles comprising a second metal thereupon, wherein the second metal is a second aluminium alloy. At S106, the method comprises depositing a third layer on the second layer by additive friction stir deposition using a third metal, wherein the third metal is a third aluminium alloy.

13 Claims, 5 Drawing Sheets

(56) References Cited

OTHER PUBLICATIONS

Jiayun Shao, Arash Samaei, Tianju Xue, Xiaoyu Xie, Shengmin Guo, Jian Cao, Eric MacDonald, Zhengtao Gan, Additive friction stir deposition of metallic materials: Process, structure and properties, Materials & Design, vol. 234, 2023, 112356, ISSN 0264-1275 (Year: 2023).*

GB Search Report for Application No. GB2117242.4 mail date May 20, 2022, 4 pages.

EP Search Report for Application No. 21275172.1 mail date May 25, 2022, 51 pages.

International Search Report and Written Opinion for International Application No. PCT/GB2022/052989 mail date Nov. 25, 2022, 13 pages.

Yuqing Mao et al: "Formation characteristic, microstructure, and mechanical performance of aluminum-based components by friction stir additive manufacturing", The International Journal of Advanced Manufacturing Technology, Springer, London, vol. 83, No. 9, Aug. 18, 2015 (Aug. 18, 2015), pp. 1637-1647, XP035745620, ISSN: 0268-3768, DOI: 10.1007/S00170-015-7595-9 [retrieved on Aug. 18, 2015] p. 1639, paragraph 2: Experimental procedure; figure 1.

Zhao Zijun et al: "Interfacial bonding features of friction stir additive manufactured build for 2195-T8 aluminum-lithium alloy", Journal of Manufacturing Processes, vol. 38, Feb. 1, 2019 (Feb. 1, 2019) pp. 396-410, XP085607040, ISSN: 1526-6125, DOI: 10.1016/J.JMAPRO.2019.01.042 p. 397, paragraph 2.1 Experimental materials.

Khomutov M et al: "Microstructure of Al—Mg—Sc—Zr alloy cold spray deposits after heat treatment and hot isostatic pressing", Journal of Alloys and Compounds, Elsevier Sequoia, Lausanne, CH, vol. 858, Oct. 20, 2020 (Oct. 20, 2020), XP086475319, ISSN: 0925-8388, DOI: 10.1016/J.JALLCOM.2020.157644 [retrieved on Oct. 20, 2020] p. 2, left-hand column.

Journal of Thermal Spray Technology, vol. 25, No. 7, 2016, Huang et al, "Effect of Tool Rotation Speed on Microstructure and Microhardness of Friction-Stir-Processed Cold-Sprayed SiCp/A.5056 Composite Coating", pp. 1357-1364. See pp. 1358 & 1359.

* cited by examiner

ADDITIVE FRICTION STIR DEPOSITION ON COLD SPRAYED BARRIER LAYER

RELATED APPLICATIONS

This application is a national phase application filed under 35 USC § 371 of PCT Application No. PCT/GB2022/052989 with an International filing date of Nov. 25, 2022, which claims priority of GB Patent Application 2117242.4 filed Nov. 30, 2021 and EP patent application Ser. No. 21/275,172.1 filed on Nov. 30, 2021. All of these applications are incorporated herein by reference in their entirety for all purposes.

FIELD

The present invention relates to additive friction stir deposition.

BACKGROUND

Deposition of a high-strength non-heat treatable alloy, for example Scalmalloy®, onto an Al—Zn alloy plate (i.e. a substrate), for example a 7xxx plate such as 7050 T7651, using additive friction stir deposition (also known as MELD) results in a high level of thermal softening of the plate, even though the as-deposited strength of the Scalmalloy deposit is good. Hence, the challenge lies in avoiding thermal degradation at the interface and into the 7xxx substrate. Mitigation options include pre-chilling the substrate, and/or deposition with the substrate in a freshly solution treated condition. Both of these options are seen as ameliorating the problem, rather than solving it, and would be hugely difficult to achieve. Chilling the substrate would involve massive expense and would introduce thermal distortion/stress issues on subsequent normalisation of temperature. Deposition in either a T351 or a W51 condition (2xxx or 7xxx alloys respectively) would provide only limited relief at the boundary of the heat affected zone where over-ageing would otherwise occur. The main softening immediately adjacent to the deposit would likely be only marginally reduced. For the 7xxx option the W51 condition is also unstable and so the plate would likely need to be refrigerated after solution treatment/stretching (at the plate mill) and then be transported at <−40° C., possibly between North America and Europe. Pre-machining under refrigeration prior to additive friction stir deposition would also be extremely challenging and costly.

Nevertheless, there is a need to improve additive friction stir deposition.

SUMMARY

According to a first aspect of the present invention, there is provided a method of manufacturing an article, the method comprising:
  obtaining a first layer having a first face and a reverse second face, wherein the first layer comprises and/or is a first metal and wherein the first metal is a heat treatable first aluminium alloy;
  providing a second layer on the first face of the first layer by cold spraying particles comprising a second metal thereupon, wherein the second metal is a second aluminium alloy; and
  depositing a third layer on the second layer by additive friction stir deposition using a third metal, wherein the third metal is a third aluminium alloy.

According to a second aspect of the present invention, there is provided an article comprising:
  a first layer, wherein the first layer comprises and/or is a first metal and wherein the first metal is a heat treatable first aluminium alloy;
  a second layer on the first layer, wherein the second layer comprises cold sprayed particles comprising a second metal thereupon, wherein the second metal is a second aluminium alloy; and
  a third layer on the second layer, wherein the third layer comprises and/or is an additive friction stir deposition third metal, wherein the third metal is a third aluminium alloy.

According to a third aspect of the present invention, there is provided use of a cold sprayed layer Al—Mg—(Sc, Zr) based alloy on a heat treatable aluminium alloy as a barrier layer.

According to a fourth aspect of the present invention, there is provided a method of manufacturing an article, the method comprising:
  obtaining a first layer having a first face and a reverse second face, wherein the first layer comprises and/or is a first metal and wherein the first metal is a heat treatable first aluminium alloy;
  providing a second layer on the first face of the first layer by cold spraying particles comprising a second metal thereupon, wherein the second metal is a second aluminium alloy;
  depositing a third layer on the second barrier layer by additive friction stir deposition using a third metal, wherein the third metal is a third aluminium alloy;
  and wherein: the second layer is a barrier layer; and the heat treatable first aluminium alloy is heat treated in a T or a W temper designation before providing the second layer thereon.

According to a fifth aspect of the present invention, there is provided use of a cold sprayed layer Al—Mg—(Sc, Zr) based alloy on a heat treatable aluminium alloy as a barrier layer, wherein the barrier layer is between the heat treatable aluminium alloy and an additive friction stir deposition aluminium alloy.

DETAILED DESCRIPTION

According to the first aspect of the present invention, there is provided a method of manufacturing an article, the method comprising:
  obtaining a first layer having a first face and a reverse second face, wherein the first layer comprises and/or is a first metal and wherein the first metal is a heat treatable first aluminium alloy;
  providing a second layer on the first face of the first layer by cold spraying particles comprising a second metal thereupon, wherein the second metal is a second aluminium alloy; and
  depositing a third layer on the second layer by additive friction stir deposition using a third metal, wherein the third metal is a third aluminium alloy.

In this way, the second layer provides a thermal barrier between the relatively hot albeit solid-state additive friction stir deposition process and the heat treatable first aluminium alloy of the first layer, thereby attenuating or avoiding thermal softening thereof. In this way, the relatively high rates of deposition by additive friction stir deposition may be exploited without degrading properties of the first layer. The second layer is incorporated (i.e. integrated) into the article and maybe of the same aluminium alloy as the third layer.

The method is of manufacturing of the article. In one example, the article comprises and/or is an aerospace component, such as an airframe component, a vehicle component, such as an engine component, or a medical component, such as an implantable medical device.

The method comprises obtaining the first layer having the first face and the reverse second face, wherein the first layer comprises and/or is the first metal. In one example, the first layer comprises and/or is a plate or an extrusion, for example subject to controlled stretching during production thereof. It should be understood that the first layer provides or is a substrate for the cold spraying, as described below.

The first metal is the heat treatable first aluminium alloy. In one example, the heat treatable first aluminium alloy is a 2XXX, a 6XXX, a 7XXX or an 8XXX series wrought aluminium alloy. 2XXX, a 6XXX, a 7XXX or an 8XXX series wrought aluminium alloys are known.

In one example, the heat treatable first aluminium alloy is heat treated in a (i.e. to a) T or a W temper designation before providing the second layer thereon.

In one example, the method comprises heat treating the heat treatable first aluminium alloy in a T or a W temper designation before providing the second layer thereon. In this way, the heat treatable first aluminium alloy is heat treated in the T or the W temper designation before the second layer is provided thereon by cold spraying. That is, the T or W temper designation is not adversely affected or not affected by the cold spraying. In one example, first layer comprises and/or is and/or is formed a plate and the T designation is T351 (e.g. 2024, 2014, 2014A, 2050 etc.), T651, T851, T7651, T7451 or T77351. In one example, first layer comprises and/or is and/or is formed from a plate and the W designation is W51 (e.g. for 7XXX alloys). In one example, first layer comprises and/or is and/or is formed from an extrusion and the T designation is T3511, T6511, T8511, T76511, T74511 or T73511 (the final "1" refers here to straightening after stretching). In one example, first layer comprises and/or is and/or is formed from an extrusion and the W designation is W511 (e.g. for 7XXX alloys).

The method comprises providing the second layer on the first face of the first layer by cold spraying particles comprising the second metal thereupon. In one example, the particles are of the second metal (i.e. the particles consist essentially or consist of the second metal).

Cold spraying (also known as gas dynamic cold spraying) is a known deposition process. Particles (typically having a particle size in a range from 1 to 50 μm in diameter, preferably 10 to 40 μm in diameter) are all accelerated in a supersonic gas jet (typically He and/or $N_2$) to speeds of up to 1200 $ms^{-1}$ from a spraying nozzle and impact upon a substrate, such as the second face. Upon impact, the particles are plastically deformed and bond thereto. A uniform layer is achieved by scanning or rastering the spray nozzle. Relatively thick layers may be achieved by repeated cold spraying and deposition rates may be relatively high. High pressure cold spraying (HPCS) uses nitrogen or helium at a pressure above 1.5 MPa, a flow rate of more than 2 $m^3$/min and a heating power of about 15 to 20 KW. HPCS is typically used for spraying metal particles, having diameters of 5 to 50 μm. Low pressure cold spraying (LPCS) uses compressed gas at a pressure of 0.5 to 1.0 MPa, a flow rate of 0.5 to 2 $m^3$/min and a heating power of 3 to 5 KW. LPCS may be used for spraying a mixture of metal and ceramic particles. The inclusion of a ceramic component in the mixture provides high-quality coatings with relatively low energy consumption. Unlike thermal spraying (such as plasma spraying, arc spraying, flame spraying or high velocity oxygen fuel spraying), the particles are not melted during cold spraying. Rather, the heat input during cold spray is relatively low, thereby reducing or eliminating residual stresses in the substrate and/or deformation thereof. Furthermore, the cold sprayed layers have low porosity, which is typically closed (i.e. not interconnected).

In one example, the cold spraying comprises cold spraying using helium. In one example, the cold spraying comprises high pressure cold spraying using He, for example at a pressure above 1.5 MPa, a flow rate of more than 2 $m^3$/min and a heating power of about 15 to 20 kW.

In one example, providing the second layer on the first face of the first layer by cold spraying particles comprising the second metal thereupon comprises providing the second layer only on the first face of the first layer by cold spraying particles comprising the second metal thereupon. That is, the method excludes cold spraying a second layer on the reverse second face of the first layer i.e. single sided.

In one example, the method comprises providing a second layer on the reverse second face of the first layer by cold spraying particles comprising the second metal thereupon. That is, the method includes cold spraying a second layer on the reverse second face of the first layer i.e. double-sided.

In one example, providing the second layer on the first face of the first layer by cold spraying particles comprising the second metal thereupon comprises selectively cold spraying the first face, for example selectively cold spraying on selected areas of the first face. In this way, the second face may be selectively cold sprayed, for example to provide, for example only provide, the second layer in desired areas.

In one example, cold spraying particles comprising the second metal on the first face comprises cold spraying particles comprising the second metal on at least 50%, 60%, 70%, 80%, 90%, 95%, 96%, 97%, 98% or 99% by area, of the first face. In one example, cold spraying particles comprising the second metal on the first face comprises cold spraying particles comprising the second metal on the entire first face.

In one example, cold spraying particles comprising the second metal on the first face comprises cold spraying particles comprising the second metal directly on the first face i.e. without an interlayer therebetween. In one example, cold spraying particles comprising the second metal on the first face comprises cold spraying particles comprising the second metal indirectly on the first face i.e. with an interlayer therebetween.

The second metal is the second aluminium alloy. In one example, the second aluminium alloy is a heat treatable second aluminium alloy. In one example, the heat treatable second aluminium alloy is a 2XXX, a 6XXX, a 7XXX or an 8XXX series wrought aluminium alloy. In one example, the second aluminium alloy is a non-heat treatable second aluminium alloy. In one example, the non-heat treatable first aluminium alloy is a 5XXX series aluminium alloy. In one example, the non-heat treatable second aluminium alloy is an Al—Mg—Sc based alloy such as 5028, an Al—Mg—Zr based alloy, an Al—Mg—Sc—Zr based alloy or an Al—Mg—Zr—Sc based alloy, generally Al—Mg—(Zr, Sc) including one or both of Zr and Sc, optionally including Er. Generally, the addition of scandium (typically between 0.1 wt. % and 0.5 wt. %) to aluminium alloys results in precipitation of nanoscale $Al_3Sc$ precipitates. The nanoscale $Al_3Sc$ precipitates increase the alloy yield strength by 50 to 70 MPa. The nanoscale $Al_3Sc$ precipitates limit excessive grain growth in the heat-affected zone of welded aluminium alloy components. This has two beneficial effects: the nanoscale $Al_3Sc$ precipitates are smaller than other precipitates formed in other aluminium alloys and the width of precipitate-free zones that normally exist at the grain boundaries of age-hardenable aluminium alloys is reduced. Scandium is also a potent grain refiner in cast aluminium alloys, and atomically, the most potent strengthener in aluminium, both as a result of grain refinement and precipitation strengthening. The nanoscale $Al_3Sc$ precipitates are coarsening resistant at relatively high temperatures (~350° C.), in contrast to typical commercial 2xxx and 6xxx alloys which quickly lose their strength at temperatures above 250° C. due to rapid coarsening of their strengthening precipitates. Additions of erbium and zirconium have been shown to increase the coarsening resistance of Al—Sc alloys to ~400° C. This is achieved by the formation of a slow-diffusing zirconium-rich shell around scandium and erbium-rich precipitate cores, forming strengthening precipitates with composition $Al_3$ (Sc,Zr,Er). Additional improvements in the coarsening resistance allow these aluminium alloys to be used at increasingly higher temperatures. In one preferred example, the non-heat treatable second aluminium alloy is Scalmalloy® (available from APWORKS GmbH, Germany), for example CT PR SCALMALLOY F. Scalmalloy is typically produced by nitrogen gas atomization and supplied as a powder, having a typical composition as summarised in Table 1 and a typical particle size distribution as summarised in Table 2.

TABLE 1

Typical composition of Scalmalloy.

| Element | Content (wt. %) |
| --- | --- |
| Aluminium | Balance |
| Magnesium | 4.20 to 5.10 |
| Scandium | 0.60 to 0.88 |
| Manganese | 0.30 to 0.80 |
| Zirconium | 0.20 to 0.50 |
| Iron | 0.40 |
| Silicon | 0.40 |
| Zinc | 0.25 |
| Titanium | 0.15 |
| Copper | 0.10 |
| Vanadium | 0.10 |
| Oxygen | 0.05 |

TABLE 2

Typical particle size distribution of Scalmalloy.

| NOMINAL PARTICLE SIZE | 20 to 63 µm | 20 to 100 µm |
| --- | --- | --- |
| APPLICATION | L-PBF | L-PBF |
| MAXIMUM PARTICLE SIZE | Max 10 wt % > 63 µm | Max 10 wt % > 100 µm |
| MINIMUM PARTICLE SIZE | Max 10 wt % < 20 µm | Max 10 wt % < 20 µm |

In one example, the particles comprising the second metal have a particle size range (i.e. a distribution) of 1 to 500 µm, preferably at least 46, 51, 61, 64, 101 or 151 µm, for example preferably 64 to 250 µm or 101 to 250 µm. Typical particle size ranges for fusion or sintering additive manufacturing processes are selective laser melting (SLM) also known as laser PBF, LPBF or L-PBF: 20 to 60 µm; selective laser sintering (SLS): 15 to 45 µm; directed energy deposition (DED): 50 to 150 µm; electron beam melting (EBM): 50 to 150 µm; laser beam melting (LBM) 10 to 60 µm; spray deposition 5 to 50 µm. Scalmalloy is typically available in particle size ranges of 20 to 63 µm and 20 to 100 µm. That is, preferably, the particles comprising the second metal are oversized compared with the typical particle size ranges for such fusion or sintering additive manufacturing processes, for example LPBF, and thus the particles comprising the second metal may be sourced as a by-product of typical production. Generally, particle size ranges may be determined according to ASTM F3049-14 Standard Guide for Characterizing Properties of Metal Powders Used for Additive Manufacturing Processes and the standards referenced therein; ASTM E2651-19 Standard Guide for Powder Particle Size Analysis; ASTM B214-16 Standard Test Method for Sieve Analysis for Metal Powders; ASTM B822-20 Standard Test Method for Particle Size Distribution of Metal Powders and Related Compounds by Light Scattering; ISO/ASTM52907-19 Additive manufacturing—Feedstock materials—Methods to characterize metallic powders. It should be understood that most particle size analysis techniques report particle size in terms of an "equivalent spherical diameter".

In one example, a thickness of the second layer is determined, at least in part, by a heat input during depositing of the third layer.

In one example, a ratio of respective thicknesses of the second layer to the third layer is in a range from 1:2 to 2:1.

In one example, the thickness of the second layer is in a range from 1 mm to 20 mm, preferably in a range from 3 mm to 15 mm, more preferably in a range from 7 mm to 10 mm.

Generally, the thickness of the cold spray deposit is at least 3 mm and quite possibly 10 to 12 mm, or even more. The optimum thickness is expected to be around 7 mm to 10 mm based on the depth of the HAZ we have seen in a 7050 plate. The thickness of the MELD deposit is likely to be more than the cold spray and possibly many factors more and could be very great indeed and almost without limitation (e.g. 100 s of mm's). So, a typical application might see a 10 mm cold spray deposition and a MELD deposition of anywhere from as little at 10 mm to perhaps >200 mm and could go >>200 mm.

The method comprises depositing the third layer on the second layer by additive friction stir deposition using the third metal, wherein the third metal is the third aluminium alloy.

It should be understood that the second metal and the third metal are mutually compatible such that the third metal is depositable by additive friction stir deposition on the second metal. It should be understood that mutually compatibility does not require compositional and/or chemical compatibility since additive friction stir deposition is a solid state process, as described below.

It should be understood that depositing the third layer on the second layer excludes fusion deposition.

Additive friction stir deposition (AFSD) (also known as friction stir deposition or MELD®) is a known deposition process, based on friction stir welding. Additive friction stir deposition is a low temperature, solid state process. This solid state deposition process shares some similarities with other high shear and elevated temperature solid-state processes, such as shear extrusion or friction stir welding and processing (FSW/P), but is significantly different in that the feedstock material (i.e. the third metal) is fed through a rotating hollow tool, with the feedstock material being deposited onto a substrate (i.e. the second layer) while remaining completely in the solid state. The feedstock may be in the form of a bar (typically round or square) or powder and is pushed through the non-consumable rotating cylindrical tool. The rotation and feeding generate heat and plastically deform the feedstock material under controlled pressure from the tool while successive layers are deposited upon the substrate. Once a layer is added, the tool is raised to begin deposition of a successive layer thereon, creating a strong metallurgical bond between layers. Advantages of additive friction stir deposition include grain refinement, homogenization, and reduction of porosity. Typically, additive friction stir deposition results in a wrought microstructure. Since the deposited material is fully dense, de-binding, sintering or HIPing are not required. Since additive friction stir deposition is a solid-state process, problems such as porosity, hot cracking, elemental segregation, and dilution (typically associated with fusion-based processes) are diminished or eliminated, because the material(s) do not solidify from the liquid phase. During the additive friction stir deposition process, temperatures are similar to those in the stir zone (SZ) of FSW, which are estimated to be between 0.6 and 0.9 Tm, where Tm is the melting point of the material(s). Additive friction stir deposition is a highly scalable process, with relatively high deposition rates for aluminium alloys over 1000 $cm^3$/h, allowing for repairing, coating and/or building fully-dense materials, including three-dimensional relatively large articles. Since additive friction stir deposition is a solid-state process, controlled atmosphere chambers and powder beds of fusion deposition processes, such as laser powder bed fusion, are avoided. Since additive friction stir deposition is a solid-state process, residual stresses are reduced.

In one example, the third aluminium alloy is a heat treatable third aluminium alloy. In one example, the heat treatable third aluminium alloy is a 2XXX, a 6XXX, a 7XXX or an 8XXX series wrought aluminium alloy. In one example, the third aluminium alloy is a non-heat treatable third aluminium alloy. In one example, the non-heat treatable first aluminium alloy is a 5XXX series aluminium alloy. In one example, the non-heat treatable third aluminium alloy is an Al—Mg—Sc based alloy such as 5028, an Al—Mg—Zr based alloy, an Al—Mg—Sc—Zr based alloy or an Al—Mg—Zr—Sc based alloy, generally Al—Mg—(Zr, Sc) including one or both of Zr and Sc, optionally including Er. In one preferred example, the non-heat treatable second aluminium alloy is Scalmalloy. The third aluminium alloy may be as described with respect to the second aluminium alloy.

In one example, depositing the third layer on the second layer by additive friction stir deposition using the third metal comprises depositing the third layer on the second layer by additive friction stir deposition of successive (i.e. a plurality) layers using the third metal.

In one example, depositing the third layer on the second layer by additive friction stir deposition using the third metal comprises depositing the third layer on the second layer by additive friction stir deposition using particles of the third metal. In one example, the particles are of the third metal (i.e. the particles consist essentially or consist of the third metal). In one example, the particles of the third metal have a particle size range (i.e. a distribution) of 1 to 500 μm, preferably at least 46, 51, 61, 64, 101 or 151 μm, for example preferably 64 to 250 μm or 101 to 250 μm. Typical particle size ranges for fusion or sintering additive manufacturing processes are selective laser melting (SLM) also known as laser PBF, LPBF or L-PBF: 20 to 60 μm; selective laser sintering (SLS): 15 to 45 μm; directed energy deposition (DED): 50 to 150 μm; electron beam melting (EBM): 50 to 150 μm; laser beam melting (LBM) 10 to 60 μm; spray deposition 5 to 50 μm. Scalmalloy is typically available in particle size ranges of 20 to 63 μm and 20 to 100 μm. That is, preferably, the particles of the third metal are oversized compared with the typical particle size ranges for such fusion or sintering additive manufacturing processes, for example LPBF, and thus the particles of the third metal may be sourced as a by-product of typical production. The particles of the third metal may be as described with respect to the particles of the second metal.

In one example, the method comprises aging before and/or after providing the second layer and/or the third layer. In this way, mechanical properties of the layers may be improved.

In one example, a ratio of respective hardnesses of the first layer before and after depositing the third layer, for example before and after providing the second layer and depositing the third layer, is in a range from 1:0.50 to 1:1.50, preferably in a range from 1:0.75 to 1:1.25, more preferably in a range from 1:0.90 to 1:1.10. That is, the hardness of the first layer is not substantially affected by depositing the third layer, due to the presence of the second layer therebetween. It should be understood that a change in hardness is associated with depositing the third layer rather than ageing and/or heat treatment, for example. For example, if the first layer is, say, 7050 W51 prior to deposition and the deposition of the cold spray fully protects the first layer from the heat of the third layer then there should be no change in hardness and so the ratio would be ~1:1. However, W51 is, by definition, unstable and so the hardness will be high if a long time has elapsed from solution treatment and controlled stretch. Conversely, if the time interval is short the hardness will be relatively low and will be increasing with time and so the hardness could actually go up after deposition but not as a result of the deposition but simply due to the passage of time. Alternatively, we may apply the process to, say, 2014A plate in a T351 condition and then age harden after cold spray and MELD deposition to a T851 condition and then see an increase in the hardness but, again, the hardness of the substrate plate should not be affected by the deposition processes.

In one example, the method comprises:
providing a fourth layer on the reverse second face of the first layer by cold spraying particles comprising a second metal thereupon, wherein the second metal is a second aluminium alloy; and
depositing a fifth layer on the fourth layer by additive friction stir deposition using a third metal, wherein the third metal is a third aluminium alloy.

That is, the cold spray and additive friction stir deposition layers are provided on both sides (i.e. double-sided). Providing the fourth layer and depositing the fifth layer may be as described with respect to providing the second layer and depositing the third layer respectively, mutatis mutandis.

According to the second aspect of the present invention, there is provided an article comprising:
a first layer, wherein the first layer comprises and/or is a first metal and wherein the first metal is a heat treatable first aluminium alloy;
a second layer on the first layer, wherein the second layer comprises cold sprayed particles comprising a second metal thereupon, wherein the second metal is a second aluminium alloy; and
a third layer on the second layer, wherein the third layer comprises and/or is an additive friction stir deposition third metal, wherein the third metal is a third aluminium alloy.

According to the third aspect of the present invention, there is provided use of a cold sprayed layer Al—Mg—(Sc, Zr) based alloy on a heat treatable aluminium alloy as a barrier layer.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE FIGURES

Embodiments of the invention will now be described by way of example only with reference to the figures, in which.

DETAILED DESCRIPTION OF THE FIGURES

Figure 1:
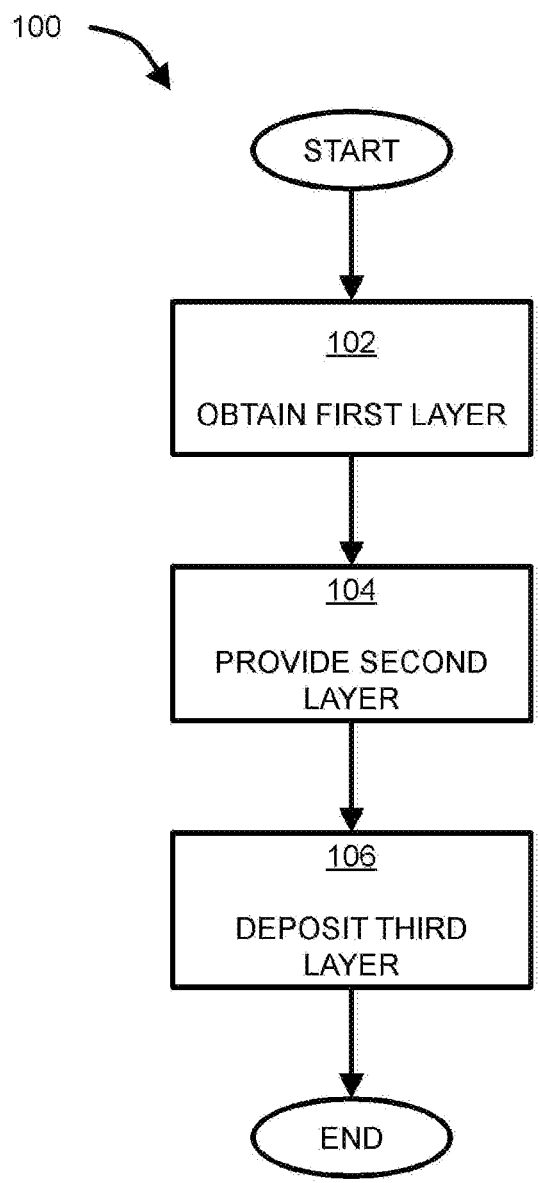
FIG. 1 shows a method according to an exemplary embodiment.

FIG. 1 shows a method 100 according to an exemplary embodiment.

The method is a method of manufacturing an article.

At S102, the method comprises obtaining a first layer having a first face and a reverse second face, wherein the first layer comprises and/or is a first metal and wherein the first metal is a heat treatable first aluminium alloy.

At S104, the method comprises providing a second layer on the first face of the first layer by cold spraying particles comprising a second metal thereupon, wherein the second metal is a second aluminium alloy.

At S106, the method comprises depositing a third layer on the second layer by additive friction stir deposition using a third metal, wherein the third metal is a third aluminium alloy.

The method may include any of the steps described with respect to the first aspect.

Figure 2:
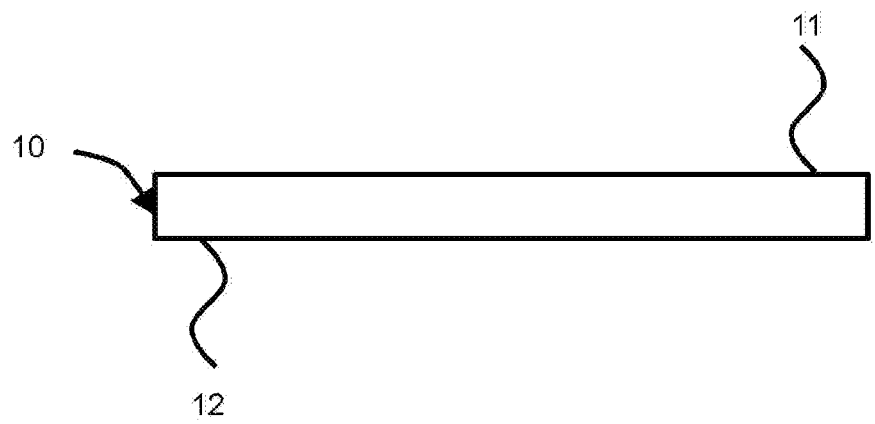
FIG. 2 shows a method according to an exemplary embodiment, in more detail.

FIG. 2 shows a method according to an exemplary embodiment, in more detail. The method is a method of manufacturing an article. The method comprises obtaining a first layer 10 having a first face 11 and a reverse second face 12, wherein the first layer 10 comprises and/or is a first metal and wherein the first metal is a heat treatable first aluminium alloy.

Figure 3:
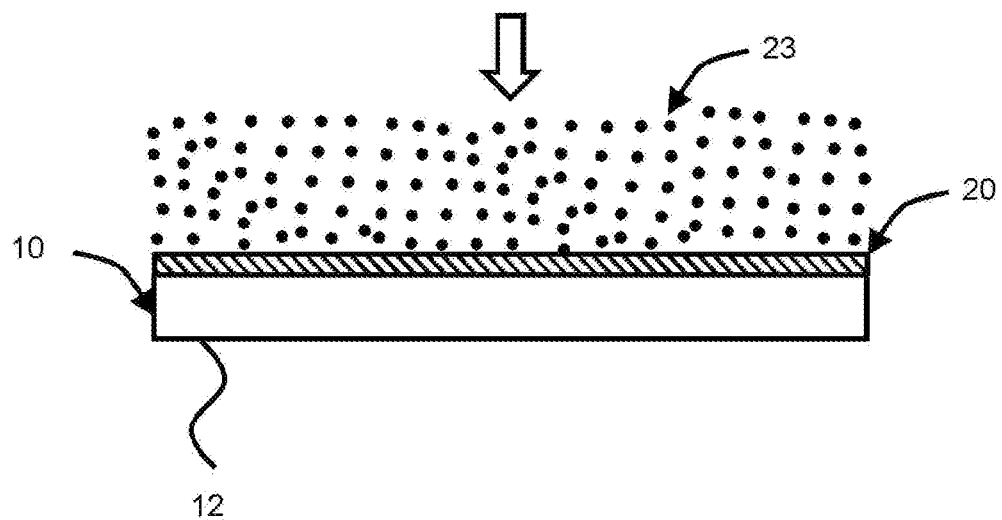
FIG. 3 shows the method of FIG. 2, in more detail.

FIG. 3 shows the method of FIG. 2, in more detail. The method comprises providing a second layer 20 on the first face 11 of the first layer 10 by cold spraying particles 23 comprising a second metal thereupon, wherein the second metal is a second aluminium alloy.

Figure 4:
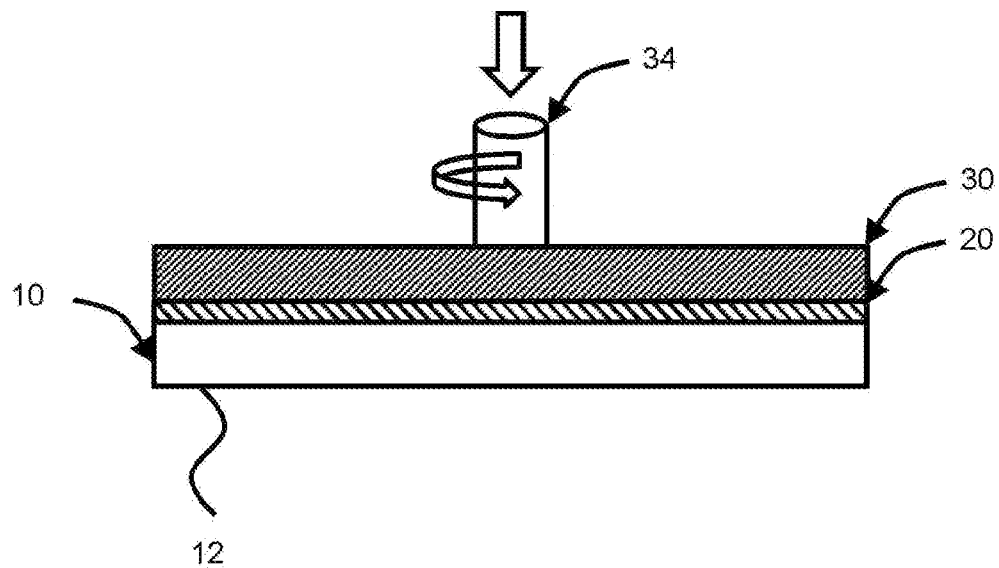
FIG. 4 shows the method of FIG. 2, in more detail.

FIG. 4 shows the method of FIG. 2, in more detail. The method comprises depositing a third layer 30 on the second layer 20 by additive friction stir deposition 34 using a third metal, wherein the third metal is a third aluminium alloy.

Figure 5:
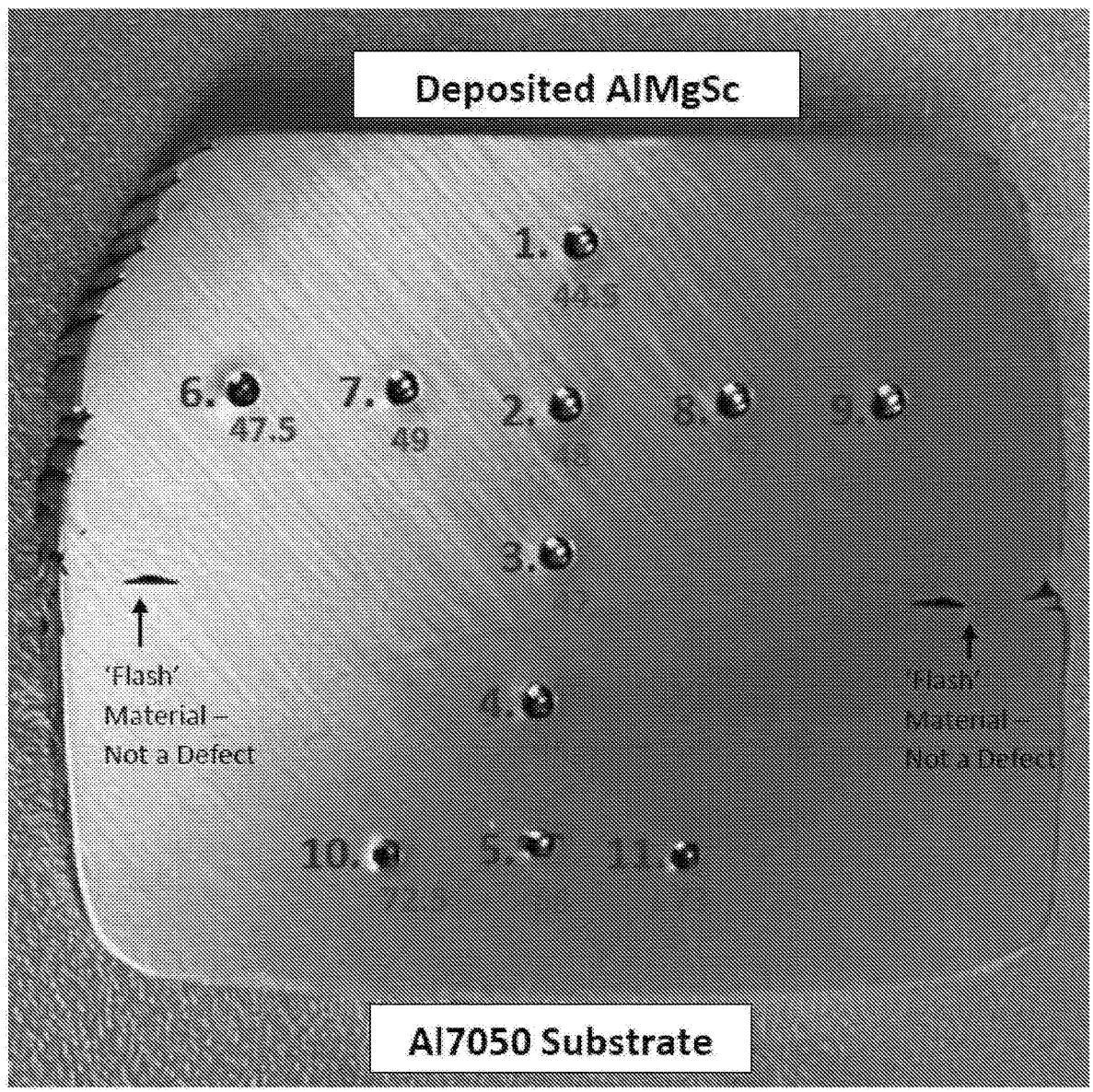
FIG. 5 shows an article according to an exemplary embodiment.

FIG. 5 shows an article 5 according to a comparative example.

In more detail, FIG. 5 shows a photograph of a Rockwell "B" hardness survey of an Al—Mg—Sc alloy (i.e. a third layer) deposited (i.e. directly) on a 7050 substrate (i.e. a first layer) by additive friction stir deposition. There is no scale shown and the interface position has to be inferred but the HAZ depth appears to be around 10 mm.

The solution identified is to deposit an interlayer (i.e. a second layer between the first layer and the third layer) of Scalmalloy by Cold Spraying direct from the powder condition. This interlayer forms a thermal barrier between the (hot) MELD process and the 7xxx substrate (at Room Temperature). The interlayer thickness is between 5 and 10 mm.

What is claimed is:

1. A method of manufacturing an article, the method comprising:
    obtaining a first layer having a first face and a reverse second face, wherein the first layer comprises and/or is a first metal and wherein the first metal is a heat treatable first aluminium alloy;
    providing a second layer on the first face of the first layer by cold spraying particles comprising a second metal thereupon, wherein the second metal is a second aluminium alloy; and
    depositing a third layer on the second barrier layer by additive friction stir deposition using a third metal, wherein the third metal is a third aluminium alloy;
    wherein:
      the second layer is a barrier layer; and
      the heat treatable first aluminium alloy is heat treated in a T or a W temper designation before providing the second layer thereon.

2. The method according to claim 1, wherein the heat treatable first aluminium alloy is a 2XXX, a 6XXX, a 7XXX or an 8XXX series wrought aluminium alloy.

3. The method according to claim 1, wherein the second aluminium alloy is a non-heat treatable second aluminium alloy.

4. The method according to claim 3, wherein the non-heat treatable second aluminium alloy is an Al—Mg—Sc based alloy, an Al—Mg—Zr based alloy, an Al—Mg—Sc—Zr based alloy or an Al—Mg—Zr—Sc based alloy.

5. The method according to claim 1, wherein a thickness of the second layer is determined, at least in part, by a heat input during depositing of the third layer.

6. The method according to claim 5, wherein a ratio of respective thicknesses of the second layer to the third layer is in a range from 1:2 to 2:1.

7. The method according to claim 5, wherein the thickness of the second layer is in a range from 1 mm to 20 mm.

8. The method according to claim 1, wherein the cold spraying comprises cold spraying using helium.

9. The method according to claim 1, wherein the third aluminium alloy is a non-heat treatable third aluminium alloy.

10. The method according to claim 9, wherein the third aluminium alloy is an Al—Mg—Sc based alloy, an Al—Mg—Zr based alloy, an Al—Mg—Sc—Zr based alloy or an Al—Mg—Zr—Sc based alloy.

11. The method according to claim 1, comprising aging before and/or after providing the second layer and/or the third layer.

12. The method according to claim 1, wherein a ratio of respective hardnesses of the first layer before and after depositing the third layer is in a range from 1:0.75 to 1:1.25.

13. An article comprising a cold sprayed layer Al—Mg—(Sc, Zr) based alloy applied on a heat treatable aluminium alloy as a barrier layer, wherein the barrier layer is between the heat treatable aluminium alloy and an additive friction stir deposition aluminium alloy.

* * * * *